(12) United States Patent
Grajcar (10) Patent No.: US 10,537,012 B2
(45) Date of Patent: *Jan. 14, 2020

(54) SYSTEM AND METHOD OF ILLUMINATING LIVESTOCK

(71) Applicant: SIGNIFY NORTH AMERICA CORPORATION, Somerset, NJ (US)

(72) Inventor: Zdenko Grajcar, Orono, MN (US)

(73) Assignee: SIGNIFY NORTH AMERICA CORPORATION, Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,948

(22) Filed: Feb. 11, 2019

(65) Prior Publication Data

US 2019/0174604 A1    Jun. 6, 2019

Related U.S. Application Data

(63) Continuation of application No. 14/906,685, filed as application No. PCT/US2014/049143 on Jul. 31, 2014, now Pat. No. 10,237,956.

(Continued)

(51) Int. Cl.
*H05B 37/02* (2006.01)
*A01K 1/00* (2006.01)

(Continued)

(52) U.S. Cl.
CPC ............. *H05B 37/029* (2013.01); *A01K 1/00* (2013.01); *A01K 29/00* (2013.01); *A01K 31/00* (2013.01);

(Continued)

(58) Field of Classification Search
CPC .............. H05B 37/029; H05B 33/0845; H05B 33/0857; H05B 37/0281; H05B 33/0824;
(Continued)

(56) References Cited

U.S. PATENT DOCUMENTS

| 4,239,020 A | 12/1980 | Kiyokawa et al. |
| 4,271,788 A | 6/1981 | Knowles |

(Continued)

FOREIGN PATENT DOCUMENTS

| CH | 662244 A5 | 9/1987 |
| CN | 101162847 A | 4/2008 |

(Continued)

OTHER PUBLICATIONS

"U.S. Appl. No. 14/906,685, Appeal Brief filed Oct. 5, 2017", 16 pgs.

(Continued)

*Primary Examiner* — Vibol Tan (57) ABSTRACT

A system and method for illuminating livestock within an agricultural dwelling. The system has a plurality of lighting assemblies that are electrically connected to a dimming device. The lighting assemblies are dimmed from a white color to predetermined wavelength to result in a predetermined behavior of the livestock. The predetermined wavelength and behavior includes a red wavelength that is undetected by the livestock thus resulting in the predetermined behavior of the livestock sleeping while workers can continue to work or function within the agricultural dwelling.

11 Claims, 6 Drawing Sheets

Related U.S. Application Data

(60) Provisional application No. 61/861,645, filed on Aug. 2, 2013.

(51) Int. Cl.
*H05B 33/08* (2006.01)
*A01K 29/00* (2006.01)
*A01K 31/00* (2006.01)
*A01K 45/00* (2006.01)
*F21V 31/00* (2006.01)

(52) U.S. Cl.
CPC ............ *A01K 45/00* (2013.01); *F21V 31/005* (2013.01); *H05B 33/0824* (2013.01); *H05B 33/0845* (2013.01); *H05B 33/0857* (2013.01); *H05B 37/0281* (2013.01)

(58) Field of Classification Search
CPC ......... F21V 31/005; A01K 1/00; A01K 29/00; A01K 31/00; A01K 45/00
See application file for complete search history.

(56) References Cited

U.S. PATENT DOCUMENTS

| | | |
|---|---|---|
| 4,625,728 A | 12/1986 | Schonberg |
| 4,700,887 A | 10/1987 | Timmons |
| 4,721,062 A | 1/1988 | Williams et al. |
| 4,872,421 A | 10/1989 | Laurent et al. |
| 4,939,426 A | 7/1990 | Menard et al. |
| RE33,600 E | 6/1991 | Timmons |
| 5,036,797 A | 8/1991 | Koozer |
| 5,108,907 A | 4/1992 | Pleass |
| 5,188,907 A | 2/1993 | Kawahara et al. |
| 5,482,210 A | 1/1996 | Carey et al. |
| 5,495,147 A | 2/1996 | Lanzisera |
| 5,575,459 A | 11/1996 | Anderson |
| 5,602,709 A | 2/1997 | Al-Dabbagh |
| 5,900,929 A | 5/1999 | Hebrank et al. |
| 6,016,038 A | 1/2000 | Mueller et al. |
| 6,116,190 A | 9/2000 | Kitt |
| 6,166,496 A | 12/2000 | Lys et al. |
| 6,224,243 B1 | 5/2001 | Karton |
| 6,236,622 B1 | 5/2001 | Blackman |
| 6,252,254 B1 | 6/2001 | Soules et al. |
| 6,357,889 B1 | 3/2002 | Duggal et al. |
| 6,461,019 B1 | 10/2002 | Allen |
| 6,573,254 B1 | 6/2003 | Kuenzel et al. |
| 6,636,003 B2 | 10/2003 | Rahm et al. |
| 6,766,767 B2 | 7/2004 | El Halawani et al. |
| 6,789,500 B2 | 9/2004 | Rozenboim |
| 6,810,832 B2 | 11/2004 | Ford |
| 6,933,707 B2 | 8/2005 | Allen |
| 6,953,266 B1 | 10/2005 | Ver Hage et al. |
| 7,038,399 B2 | 5/2006 | Lys et al. |
| 7,081,722 B1 | 7/2006 | Huynh et al. |
| 7,102,334 B2 | 9/2006 | Wiegand et al. |
| 7,102,344 B1 | 9/2006 | Short et al. |
| 7,131,397 B2 | 11/2006 | El Halawani et al. |
| 7,213,942 B2 | 5/2007 | Jiang et al. |
| 7,220,018 B2 | 5/2007 | Crabb et al. |
| 7,288,902 B1 | 10/2007 | Melanson |
| 7,352,138 B2 | 4/2008 | Lys et al. |
| 7,358,679 B2 | 4/2008 | Lys et al. |
| 7,378,805 B2 | 5/2008 | Oh et al. |
| 7,391,630 B2 | 6/2008 | Acatmei |
| 7,425,801 B2 | 9/2008 | Ozaki |
| 7,436,134 B2 | 10/2008 | Levine |
| 7,489,086 B2 | 2/2009 | Miskin et al. |
| 7,709,774 B2 | 5/2010 | Schulz et al. |
| 7,723,926 B2 | 5/2010 | Mednik et al. |
| 7,781,979 B2 | 8/2010 | Lys |
| 7,791,289 B2 | 9/2010 | Oosterbaan et al. |
| 7,847,486 B2 | 12/2010 | Ng |
| 7,847,496 B2 | 12/2010 | Bui et al. |
| 7,859,196 B2 | 12/2010 | Lee et al. |
| 7,863,831 B2 | 1/2011 | Vos |
| 7,880,400 B2 | 2/2011 | Zhou et al. |
| 7,902,769 B2 | 3/2011 | Shteynberg et al. |
| 7,936,135 B2 | 5/2011 | Hum et al. |
| 7,977,892 B2 | 7/2011 | Lee et al. |
| 8,102,167 B2 | 1/2012 | Irrisou et al. |
| 8,120,279 B2 | 2/2012 | Oosterbaan et al. |
| 8,134,303 B2 | 3/2012 | Lys |
| 8,159,125 B2 | 4/2012 | Miao |
| 8,164,276 B2 | 4/2012 | Kuwabara |
| 8,188,679 B2 | 5/2012 | Hoogzaad |
| 8,188,687 B2 | 5/2012 | Lee et al. |
| 8,205,577 B2 | 6/2012 | Sia et al. |
| 8,324,642 B2 | 12/2012 | Grajcar |
| 8,324,840 B2 | 12/2012 | Shteynberg et al. |
| 8,373,363 B2 | 2/2013 | Grajcar |
| 8,384,307 B2 | 2/2013 | Grajcar |
| 8,468,976 B2 | 6/2013 | Kakimi et al. |
| 8,471,483 B2 | 6/2013 | Lee et al. |
| 8,531,136 B2 | 9/2013 | Grajcar |
| 8,593,044 B2 | 11/2013 | Grajcar |
| 8,596,804 B2 | 12/2013 | Grajcar |
| 8,598,799 B2 | 12/2013 | Tai et al. |
| 8,643,308 B2 | 2/2014 | Grajcar |
| 8,657,463 B2 | 2/2014 | Lichten et al. |
| 8,736,194 B2 | 5/2014 | Kawai et al. |
| 8,773,031 B2 | 7/2014 | Sadwick et al. |
| 8,796,955 B2 | 8/2014 | Grajcar |
| 8,858,005 B2 | 10/2014 | Grajcar |
| 8,876,313 B2 | 11/2014 | Grajcar |
| 8,907,576 B2 | 12/2014 | Ferrier |
| 8,922,136 B2 | 12/2014 | Grajcar |
| 9,155,151 B2 | 10/2015 | Angles |
| 9,210,755 B2 | 12/2015 | Grajcar |
| 9,247,603 B2 | 1/2016 | Grajcar et al. |
| 9,374,858 B2 | 6/2016 | Ni |
| 9,433,046 B2 | 8/2016 | Grajcar |
| 9,482,397 B2 | 11/2016 | Grajcar |
| 9,700,019 B2 | 7/2017 | Grajcar |
| 9,709,228 B2 | 7/2017 | Grajcar |
| 9,756,837 B2 | 9/2017 | Grajcar |
| 9,844,210 B2 | 12/2017 | Grajcar et al. |
| 10,237,956 B2 | 3/2019 | Grajcar |
| 2002/0003233 A1 | 1/2002 | Mueller-Mach et al. |
| 2002/0047606 A1 | 4/2002 | Guthrie et al. |
| 2002/0097007 A1 | 7/2002 | Koncz et al. |
| 2002/0149929 A1 | 10/2002 | Evans et al. |
| 2003/0164809 A1 | 9/2003 | Leung |
| 2003/0172878 A1 | 9/2003 | Halawani et al. |
| 2005/0212458 A1 | 9/2005 | Powers, Jr. et al. |
| 2005/0241593 A1 | 11/2005 | Kaura |
| 2005/0256554 A1 | 11/2005 | Malak |
| 2005/0276720 A1 | 12/2005 | Correa |
| 2005/0280964 A1 | 12/2005 | Richmond et al. |
| 2007/0086912 A1 | 4/2007 | Dowling et al. |
| 2007/0182338 A1 | 8/2007 | Shteynberg et al. |
| 2007/0258240 A1 | 11/2007 | Ducharme et al. |
| 2008/0012722 A1 | 1/2008 | Moseley et al. |
| 2008/0017120 A1 | 1/2008 | Hawk |
| 2008/0042588 A1 | 2/2008 | Chan et al. |
| 2008/0116816 A1 | 5/2008 | Neuman et al. |
| 2008/0174233 A1 | 7/2008 | Bawendi et al. |
| 2008/0178819 A1 | 7/2008 | Sia et al. |
| 2008/0198009 A1 | 8/2008 | Hoeben et al. |
| 2008/0202443 A1 | 8/2008 | Potter |
| 2008/0203936 A1 | 8/2008 | Mariyama et al. |
| 2008/0211421 A1 | 9/2008 | Lee et al. |
| 2008/0218995 A1 | 9/2008 | Gilkey et al. |
| 2009/0096739 A1 | 4/2009 | Lan et al. |
| 2009/0160370 A1 | 6/2009 | Tai et al. |
| 2009/0185373 A1 | 7/2009 | Grajcar |
| 2009/0262515 A1 | 10/2009 | Lee et al. |
| 2009/0267534 A1 | 10/2009 | Godbole et al. |
| 2010/0013402 A1 | 1/2010 | Chaffai et al. |
| 2010/0060175 A1 | 3/2010 | Lethellier |
| 2010/0072903 A1 | 3/2010 | Blaut et al. |
| 2010/0164579 A1 | 7/2010 | Acatrinei |
| 2010/0165677 A1 | 7/2010 | Wang et al. |

(56) References Cited

U.S. PATENT DOCUMENTS

| | | |
|---|---|---|
| 2010/0225241 A1 | 9/2010 | Maehara et al. |
| 2010/0237800 A1 | 9/2010 | Kang et al. |
| 2010/0294205 A1 | 11/2010 | Kakimi et al. |
| 2010/0308739 A1 | 12/2010 | Shteynberg et al. |
| 2010/0308751 A1 | 12/2010 | Nerone |
| 2010/0310552 A1 | 12/2010 | Rapp et al. |
| 2010/0315012 A1 | 12/2010 | Kim et al. |
| 2011/0018465 A1 | 1/2011 | Ashdown |
| 2011/0031888 A1 | 2/2011 | Datta et al. |
| 2011/0031890 A1 | 2/2011 | Stack et al. |
| 2011/0037415 A1 | 2/2011 | Juestel et al. |
| 2011/0084619 A1 | 4/2011 | Gray |
| 2011/0088314 A1* | 4/2011 | Jacobs .................. A01G 9/22 47/32.3 |
| 2011/0101883 A1* | 5/2011 | Grajcar ................ A01K 29/00 315/291 |
| 2011/0109244 A1 | 5/2011 | Grajcar |
| 2011/0163680 A1 | 7/2011 | Welten |
| 2011/0183368 A1* | 7/2011 | Chapman ............ A01G 7/045 435/29 |
| 2011/0210678 A1 | 9/2011 | Grajcar |
| 2011/0227490 A1 | 9/2011 | Huynh |
| 2011/0228515 A1 | 9/2011 | Grajcar |
| 2011/0273103 A1 | 11/2011 | Hong |
| 2012/0001558 A1 | 1/2012 | Vos |
| 2012/0002408 A1* | 1/2012 | Lichten ................. F21S 8/063 362/218 |
| 2012/0025709 A1 | 2/2012 | Zampini et al. |
| 2012/0044713 A1 | 2/2012 | Chiang et al. |
| 2012/0081009 A1 | 4/2012 | Shteynberg et al. |
| 2012/0081018 A1 | 4/2012 | Shteynberg et al. |
| 2012/0104977 A1* | 5/2012 | McKenzie ........... A01G 7/045 315/312 |
| 2012/0153833 A1 | 6/2012 | Mikani et al. |
| 2012/0186524 A1 | 7/2012 | Grajcar |
| 2012/0200229 A1 | 8/2012 | Kunst et al. |
| 2012/0223649 A1 | 9/2012 | Saes et al. |
| 2012/0268918 A1 | 10/2012 | Grajcar |
| 2012/0299500 A1 | 11/2012 | Sadwick et al. |
| 2013/0016506 A1 | 1/2013 | Odom, Jr. |
| 2013/0069536 A1 | 3/2013 | Ni |
| 2013/0069546 A1 | 3/2013 | Lin et al. |
| 2013/0127356 A1 | 5/2013 | Tanaka et al. |
| 2013/0134888 A1 | 5/2013 | Grajcar |
| 2013/0153938 A1 | 6/2013 | Grajcar |
| 2013/0157394 A1 | 6/2013 | Grajcar |
| 2013/0169159 A1 | 7/2013 | Lys |
| 2013/0187572 A1 | 7/2013 | Grajcar |
| 2013/0193864 A1 | 8/2013 | Angeles |
| 2013/0200812 A1 | 8/2013 | Radermacher et al. |
| 2013/0207555 A1 | 8/2013 | Qiu et al. |
| 2013/0234622 A1 | 9/2013 | Tanaka et al. |
| 2013/0342120 A1 | 12/2013 | Creusen et al. |
| 2014/0098531 A1 | 4/2014 | Grajcar |
| 2014/0103823 A1 | 4/2014 | Kahman et al. |
| 2014/0111091 A1 | 4/2014 | Grajcar et al. |
| 2014/0126174 A1 | 5/2014 | Grajcar |
| 2014/0159584 A1 | 6/2014 | Grajcar |
| 2014/0159615 A1 | 6/2014 | Grajcar |
| 2014/0197741 A1 | 7/2014 | Sakai et al. |
| 2014/0197751 A1 | 7/2014 | Grajcar |
| 2014/0210352 A1 | 7/2014 | Grajcar |
| 2014/0210357 A1 | 7/2014 | Yan et al. |
| 2014/0252340 A1 | 9/2014 | Wang |
| 2015/0061534 A1 | 3/2015 | Grajcar |
| 2015/0069932 A1 | 3/2015 | Grajcar |
| 2015/0115845 A1 | 4/2015 | Grajcar |
| 2015/0136037 A1 | 5/2015 | Boonekamp et al. |
| 2015/0204497 A1 | 7/2015 | Grajcar |
| 2015/0230309 A1 | 8/2015 | Grajcar et al. |
| 2015/0237696 A1 | 8/2015 | Shackle |
| 2015/0247631 A1 | 9/2015 | Grajcar et al. |
| 2015/0273235 A1 | 10/2015 | Grajcar |
| 2016/0113079 A1 | 4/2016 | Hiramatu et al. |
| 2016/0165698 A1 | 6/2016 | Grajcar |
| 2016/0212817 A1 | 7/2016 | Grajcar et al. |
| 2016/0242448 A1 | 8/2016 | Ludescher et al. |
| 2016/0316727 A1 | 11/2016 | Grajcar et al. |
| 2016/0323960 A1 | 11/2016 | Grajcar |
| 2017/0000163 A1 | 1/2017 | Grajcar |
| 2017/0064781 A1 | 3/2017 | Haskvitz |
| 2017/0105391 A1 | 4/2017 | Grajcar |
| 2017/0273281 A1 | 9/2017 | Grajcar et al. |
| 2017/0290124 A1 | 10/2017 | Grajcar |

FOREIGN PATENT DOCUMENTS

| | | |
|---|---|---|
| CN | 101672839 A | 3/2010 |
| CN | 102612791 A | 7/2012 |
| CN | 104106122 A | 10/2014 |
| CN | 205694943 U | 11/2016 |
| EP | 0064175 A1 | 11/1982 |
| EP | 0229583 A2 | 7/1987 |
| EP | 1502483 A1 | 2/2005 |
| EP | 2094063 A1 | 8/2009 |
| EP | 2465174 A1 | 2/2011 |
| EP | 2465329 A1 | 7/2012 |
| EP | 2666220 A2 | 7/2012 |
| EP | 2795654 A1 | 10/2014 |
| GB | 2522020 A | 7/2015 |
| JP | H05199823 A | 8/1993 |
| JP | 2004248333 A | 9/2004 |
| JP | 2005137238 A | 6/2005 |
| JP | 2006147933 A | 6/2006 |
| JP | 2006244848 A | 9/2006 |
| JP | 2007511903 A | 5/2007 |
| JP | 2007299788 A | 11/2007 |
| JP | 2008059811 A | 3/2008 |
| JP | 2008218043 A | 9/2008 |
| JP | 2009026544 A | 2/2009 |
| JP | 2009035673 A | 2/2009 |
| JP | 2009060069 A | 3/2009 |
| JP | 2009117036 A | 5/2009 |
| JP | 2009123427 A | 6/2009 |
| JP | 2009171866 A | 6/2009 |
| JP | 2011040701 A | 2/2011 |
| JP | 2014516452 A | 7/2014 |
| JP | 5676611 B2 | 1/2015 |
| KR | 20120112146 A | 10/2012 |
| WO | WO-1984000693 A1 | 3/1984 |
| WO | WO-1999050916 | 10/1999 |
| WO | WO-2000033389 | 6/2000 |
| WO | WO-2000056330 | 9/2000 |
| WO | WO-0106630 A1 | 1/2001 |
| WO | WO-2001006630 A1 | 1/2001 |
| WO | WO-02061427 A1 | 8/2002 |
| WO | WO-2002061427 A1 | 8/2002 |
| WO | WO-2005084080 A2 | 9/2005 |
| WO | WO-2008114250 A1 | 9/2008 |
| WO | WO-2010037009 A1 | 4/2010 |
| WO | WO-2012100183 A2 | 7/2012 |
| WO | WO-2013044916 A1 | 4/2013 |
| WO | WO-2013090505 A1 | 6/2013 |
| WO | WO-2013100736 A1 | 7/2013 |
| WO | WO-2013169159 A1 | 11/2013 |
| WO | WO-2014047473 A1 | 3/2014 |
| WO | WO-2014052897 A1 | 4/2014 |
| WO | WO-2014200960 A1 | 12/2014 |
| WO | WO-2015002665 A1 | 1/2015 |
| WO | WO-2015017655 A1 | 2/2015 |
| WO | WO-2015038720 A1 | 3/2015 |
| WO | WO-2015105776 A1 | 7/2015 |
| WO | WO-2015105823 A1 | 7/2015 |
| WO | WO-2015113818 A1 | 8/2015 |
| WO | WO-2016033002 A1 | 3/2016 |
| WO | WO 2017004318 A1 | 1/2017 |
| WO | WO-2017172869 A1 | 10/2017 |

OTHER PUBLICATIONS

"U.S. Appl. No. 14/906,685, Corrected Notice of Allowability dated Feb. 13, 2019", 2 pgs.

(56) References Cited

OTHER PUBLICATIONS

"U.S. Appl. No. 14/906,685, Examiner Review Summary dated Feb. 14, 2018", 3 pgs.
"U.S. Appl. No. 14/906,685, Final Office Action dated Dec. 5, 2016", 8 pgs.
"U.S. Appl. No. 14/906,685, Non Final Office Action dated Jun. 14, 2016", 9 pgs.
"U.S. Appl. No. 14/906,685, Non Final Office Action dated Nov. 9, 2017", 8 pgs.
"U.S. Appl. No. 14/906,685, Notice of Allowance dated Mar. 9, 2018", 7 pgs.
"U.S. Appl. No. 14/906,685, Notice of Allowance dated Jul. 13, 2018", 5 pgs.
"U.S. Appl. No. 14/906,685, Notice of Allowance dated Nov. 2, 2018", 5 pgs.
"U.S. Appl. No. 14/906,685, Preliminary Amendment filed Jan. 21, 2016", 3 pgs.
"U.S. Appl. No. 14/906,685, Response filed Nov. 11, 2016 to Non Final Office Action dated Jun. 14, 2016", 7 pgs.
"U.S. Appl. No. 14/906,685 Response filed Feb. 8, 2018 to Non-Final Office Action dated Nov. 9, 2017.pdf", 6 pgs.
"U.S. Appl. No. 15/108,690,Amendment & Response Under 37 CFR 1.114 Filed Apr. 20, 2018", 6 pgs.
"U.S. Appl. No. 15/108,690, Notice of Allowance dated Jan. 24, 2018", 9 pgs.
"U.S. Appl. No. 15/108,690, Notice of Allowance dated May 22, 2018", 5 pgs.
"U.S. Appl. No. 15/108,690, Notice of Allowance dated Sep. 26, 2018", 5 pgs.
"Chinese Application Serial No. 201480047295.6, First Office Action dated Apr. 24, 2017.", w. English Translation, 12 pgs.
"Chinese Application Serial No. 201480047295.6, Second Office Action dated Sep. 26, 2017", w. English Translation, 11 pgs.
"European Application No. EP10827580.1 Extended European_Search_Report_dated Feb. 5, 2016", (Feb. 5, 2016), 6 pgs.
"European Application No. EP10827580.1 Office Action_dated Apr. 13, 2017", (Apr. 13, 2017), 5 pgs.
"European Application No. EP11757037.4 European_Search_Report_ dated Nov. 24, 2017", (Nov. 24, 2017), 9 pgs.
"European Application No. EP12739301.5 European_Search_Report_ dated Nov. 24, 2017", (Nov. 24, 2017), 10 pgs.
"European Application No. EP13838707.1 European Search Report dated Jun. 10, 2016", (Jun. 10, 2016), 11 pgs.
"European Application No. EP15735446.5 European_Search_Report_ dated Jul. 26, 2017", (Jul. 26, 2017), 9 pgs.
"European Application Serial No. EP14843579.5, Extended European Search Report dated Apr. 28, 2017", (Apr. 28, 2017), 2 pgs.
"European Application Serial No. 15734927.5, search report dated May 9, 2017", (May 9, 2017), 8 pgs.
"Global Dossier Translation of 1st Office Action dated Apr. 24, 2017 for CN Application No. CN201480047295.6", (Apr. 24, 2017), 9 pgs.
"Global Dossier Translation of 1st Office Action dated Jan. 26, 2014 for CN Application No. CN201080046791.1", (Jan. 26, 2014), 10 pgs.
"Global Dossier Translation of 1st Office Action dated Jan. 26, 2014 for CN Application No. CN201080046880.6", (Jan. 26, 2014), 7 pgs.
"Global Dossier Translation of 1st Office Action dated Jul. 2, 2014 for CN Application No. CN201180022574.3", (Jul. 2, 2014), 5 pgs.
"Global Dossier Translation of 1st Office Action dated Mar. 2, 2016 for CN Application No. CN2013800546160", (Mar. 2, 2016), 9 pgs.
"Global Dossier Translation of 1st Office Action dated May 27, 2014 for CN Application No. CN201280007111.4", (May 27, 2014), 12 pgs.
"Global Dossier Translation of 1st Office Action dated Oct. 25, 2016 for CN Application No. CN201510072474.1", (Oct. 25, 2016), 4 pgs.
"Global Dossier Translation of 1st Office Action dated Oct. 9, 2016 for CN Application No. CN201510214363.X", (Oct. 9, 2016), 7 pgs.
"Global Dossier Translation of 2nd Office Action dated Aug. 19, 2014 for CN Application No. CN201080046791.1", (Aug. 19, 2014), 5 pgs.
"Global Dossier Translation of 2nd Office Action dated Dec. 12, 2016 for CN Application No. CN201510072474.1", (Dec. 12, 2016), 4 pgs.
"Global Dossier Translation of 2nd Office Action dated Dec. 17, 2014 for CN Application No. CN201280007111.4", (Dec. 17, 2014), 13 pgs.
"Global Dossier Translation of 2nd Office Action dated Feb. 9, 2015 for CN Application No. CN201180022574.3", (Feb. 9, 2015), 7 pgs.
"Global Dossier Translation of 2nd Office Action dated May 12, 2017 for CN Application No. CN201510214363.X", (May 12, 2017), 6 pgs.
"Global Dossier Translation of 2nd Office Action dated Nov. 30, 2016 for CN Application No. CN2013800546160", (Nov. 30, 2016), 10 pgs.
"Global Dossier Translation of 2nd Office Action dated Sep. 26, 2017 for CN Application No. CN201480047295.6", (Sep. 26, 2017), 7 pgs.
"Global Dossier Translation of 3rd Office Action dated Aug. 27, 2015 for CN Application No. CN201180022574.3", (Jun. 7, 2018), 8 pgs.
"Global Dossier Translation of 3rd Office Action dated Feb. 5, 2018 for CN Application No. CN201480047295.6", (Feb. 5, 2018), 6 pgs.
"Global Dossier Translation of 3rd Office Action dated Jun. 11, 2015 for CN Application No. CN201280007111.4", (Jun. 11, 2015), 5 pgs.
"Global Dossier Translation of 3rd Office Action dated Jun. 26, 2017 for CN Application No. CN2013800546160", (Jun. 26, 2017), 4 pgs.
"Global Dossier Translation of 3rd Office Action dated Oct. 19, 2017 for CN Application No. CN201510214363.X", (Oct. 19, 2017), 8 pgs.
"Global Dossier Translation of 4th Office Action dated Apr. 18, 2016 for CN Application No. CN201180022574.3", (Apr. 18, 2016), 4 pgs.
"Global Dossier Translation of 4th Office Action dated Nov. 25, 2015 for CN Application No. CN201280007111.4", (Nov. 25, 2015), 4 pgs.
"Hazard of Harmonics and Neutral Overloads", American Power Conversion Legendary Reliability: White Paper #26, (2003), 8 pgs.
"Hazards of Harmonics and Neutral Overloads", White Paper#26 APC Legendary Reliability, (2003), 8 pgs.
"International Application Serial No. PCT/US2010/045467, International Preliminary Report on Patentability dated Feb. 14, 2012", (Feb. 14, 2012), 7 pgs.
"International Application Serial No. PCT/US2010/045467, International Search Report dated Oct. 7, 2010", (Oct. 7, 2010), 2 pgs.
"International Application Serial No. PCT/US2010/045467, International Search Report dated Feb. 17, 2011", (Feb. 17, 2011), 2 pgs.
"International Application Serial No. PCT/US2010/045467, Written Opinion dated Oct. 7, 2010", (Oct. 7, 2010), 6 pgs.
"International Application Serial No. PCT/US2010/045467, Written Opinion dated Feb. 14, 2012", (Feb. 14, 2012), 6 pgs.
"International Application Serial No. PCT/US2010/054506, International Preliminary Report on Patentability dated May 1, 2012", (May 1, 2012), 7 pgs.
"International Application Serial No. PCT/US2010/054506, International Search Report dated Dec. 28, 2010", (Dec. 28, 2010), 2 pgs.
"International Application Serial No. PCT/US2010/054506, International Search Report dated May 5, 2011", (May 5, 2018), 2 pgs.
"International Application Serial No. PCT/US2010/054506, Written Opinion dated Dec. 28, 2010", (Dec. 28, 2010), 6 pgs.
"International Application Serial No. PCT/US2010/054506, Written Opinion dated Apr. 28, 2012", (Apr. 28, 2012), 6 pgs.
"International Application Serial No. PCT/US2010/054869, International Preliminary Report on Patentability dated May 1, 2012", (May 1, 2012), 5 pgs.

(56) References Cited

OTHER PUBLICATIONS

"International Application Serial No. PCT/US2010/054869, International Search Report dated Jan. 12, 2011", (Jan. 12, 2011), 2 pgs.
"International Application Serial No. PCT/US2010/054869, International Search Report dated May 5, 2011", (May 5, 2011), 2 pgs.
"International Application Serial No. PCT/US2010/054869, International Written Opinion dated Jan. 12, 2011", (Jan. 12, 2011), 4 pgs.
"International Application Serial No. PCT/US2010/054869, Written Opinion dated Apr. 29, 2012", (Apr. 29, 2012), 4 pgs.
"International Application Serial No. PCT/US2011/028910, International Preliminary Report on Patentability dated Sep. 18, 2012", (Sep. 18, 2012), 5 pgs.
"International Application Serial No. PCT/US2011/028910, International Search Report dated May 26, 2011", (May 26, 2011), 2 pgs.
"International Application Serial No. PCT/US2011/028910, Written Opinion dated May 26, 2011", (May 26, 2011), 4 pgs.
"International Application Serial No. PCT/US2012/022370, International Preliminary Report on Patentability dated Jul. 30, 2013", (Jul. 30, 2013), 6 pgs.
"International Application Serial No. PCT/US2012/022370, International Search Report dated May 25, 2012", (May 25, 2018), 2 pgs.
"International Application Serial No. PCT/US2012/022370, Written Opinion dated May 25, 2012", (May 25, 2012), 5 pgs.
"International Application Serial No. PCT/US2013/060983, International Preliminary Report on Patentability dated Mar. 24, 2015", (Mar. 24, 2015), 7 pgs.
"International Application Serial No. PCT/US2013/060983, International Search Report dated Jan. 2, 2014", (Jan. 2, 2014), 3 pgs.
"International Application Serial No. PCT/US2013/060983, International Search Report dated Mar. 27, 2014", (Mar. 27, 2018), 3 pgs.
"International Application Serial No. PCT/US2013/060983, Written Opinion dated Jan. 2, 2014", (Jan. 2, 2014), 6 pgs.
"International Application Serial No. PCT/US2013/060983, Written Opinion dated Mar. 21, 2015", (Mar. 21, 2015), 6 pgs.
"International Application Serial No. PCT/US2013/078368 International Search Report dated Mar. 27, 2014", (Mar. 27, 2014), 3 pgs.
"International Application Serial No. PCT/US2013/078368, Written Opinion dated Mar. 27, 2014", (Mar. 27, 2014), 6 pgs.
"International Application Serial No. PCT/US2014/049143, International Preliminary Report on Patentability dated Feb. 11, 2016", (Feb. 11, 2016), 6 pgs.
"International Application Serial No. PCT/US2014/049143, International Search Report dated Nov. 6, 2014", (Nov. 6, 2014), 2 pgs.
"International Application Serial No. PCT/US2014/049143, Written Opinion dated Nov. 6, 2014", 4 pgs.
"International Application Serial No. PCT/US2014/055106, International Search Report dated Dec. 18, 2014", (Dec. 18, 2014), 2 pgs.
"International Application Serial No. PCT/US2014/055106, Written Opinion dated Dec. 18, 2014", (Dec. 18, 2014), 3 pgs.
"International Application Serial No. PCT/US2015/010268, International Preliminary Report on Patentability dated Jul. 12, 2016", (Jul. 12, 2016), 5 pgs.
"International Application Serial No. PCT/US2015/010268, International Search Report dated May 1, 2015", (May 1, 2015), 2 pgs.
"International Application Serial No. PCT/US2015/010268, International Search Report dated Jul. 16, 2015", (Jul. 16, 2015), 2 pgs.
"International Application Serial No. PCT/US2015/010268, Written Opinion dated May 1, 2015", (May 1, 2015), 4 pgs.
"International Application Serial No. PCT/US2015/010268, Written Opinion dated Jul. 16, 2015", (Jul. 16, 2015), 4 pgs.
"International Application Serial No. PCT/US2015/010407, International Preliminary Report on Patentability dated Jul. 21, 2016", (Nov. 6, 2014), 6 pgs.
"International Application Serial No. PCT/US2015/010407, International Search Report dated Apr. 7, 2015", (Apr. 7, 2015), 2 pgs.
"International Application Serial No. PCT/US2015/010407, Written Opinion dated Apr. 7, 2015", 4 pgs.
"International Application Serial No. PCT/US2015/046641, International Preliminary Report on Patentabililty dated Mar. 9, 2017.", (Mar. 9, 2017), 7 pgs.
"International Application Serial No. PCT/US2015/046641, Search Report Written Opinion dated Nov. 24, 2015.", (Nov. 24, 2015), 8 pgs.
"International Application Serial No. PCT/US2016/040286, International Preliminary Report on Patentability dated Jan. 2, 2018", (Jan. 2, 2018), 7 pgs.
"International Application Serial No. PCT/US2016/040286, International Search Report dated Oct. 28, 2016", (Oct. 28, 2016), 4 pgs.
"International Application Serial No. PCT/US2016/040286, International Search Report dated Jan. 5, 2017", (Jan. 5, 2017), 4 pgs.
"International Application Serial No. PCT/US2016/040286, Written Opinion dated Oct. 28, 2016", (Oct. 28, 2016), 6 pgs.
"International Application Serial No. PCT/US2016/040286, Written Opinion dated Jan. 5, 2017", (Jan. 5, 2017), 6 pgs.
"International Application Serial No. PCT/US2016/049433, International Search Report dated Nov. 15, 2016", (Nov. 15, 2018), 2 pgs.
"International Application Serial No. PCT/US2016/049433, Written Opinion dated Nov. 15, 2016", (Nov. 15, 2016), 6 pgs.
"International Application Serial No. PCT/US2017/024679, International Preliminary Report on Patentability dated Oct. 11, 2018",7 pgs.
"International Application Serial No. PCT/US2017/024679, International Search Report dated Aug. 2, 2017", (Aug. 2, 2017), 4 pgs.
"International Application Serial No. PCT/US2017/024679, Invitation to Pay Additional Fees and Partial Search Report dated Jun. 7, 2017", (Jun. 7, 2012), 2 pgs.
"International Application Serial No. PCT/US2017/024679, Written Opinion dated Aug. 2, 2017", (Aug. 2, 2017), 5 pgs.
"International Application Serial No. PCT/US2018/023535, International Search Report dated May 24, 2018", (May 24, 2018), 3 pgs.
"International Application Serial No. PCT/US2018/023535, Written Opinion dated May 24, 2018", (May 24, 2018), 7 pgs.
"Lighting for Layers", TAS Issue May 17, 2005, Technical Advice Sheet, (c)British United Turkeys Limited, (2005), 3 pgs.
"Machine Translation of 1st Office Action dated Aug. 9, 2016 for JP Application No. JP5195838", (Aug. 9, 2018), 3 pgs.
"Machine Translation of 1st Office Action dated Mar. 26, 2014 for JP Application No. JP2012524901", (Mar. 26, 2014), 2 pgs.
"Machine Translation of 1st Office Action dated Mar. 4, 2014 for JP Application No. JP2012524899", (Mar. 4, 2014), 3 pgs.
"Machine Translation of 1st Office Action dated Nov. 17, 2015 for JP Application No. JP2014261766", (Nov. 17, 2015), 4 pgs.
"Machine Translation of 2nd Office Action dated Dec. 19, 2014 for JP Application No. JP2012524901", (Dec. 19, 2014), 2 pgs.
"Natura 60", Big Dutchman The modern aviary for bard and free range egg production, (Apr. 2010), 3 pgs.
"Natura 70", Big Dutchman The modern aviary for bard and free range egg production, (Dec. 2010), 3 pgs.
"Sequential Linear LED Driver", Supertex inc. : DOC.# DSFP-CL8800, (2014), 7 pgs.
"TPS92411x Floating Switch for Offline AC Linear Direct Drive of LEDs with Low Ripple Current", Texas Instruments: SLUSBQ6B, (Oct. 2013), 29 pgs.
Bowmaker, James K, et al., "Evolution of vertebrate visual pigments", Current Biology vol. 16 No. 13 R484, 6 pgs.
Bruininx, E.M A. M., et al., "A prolonged photoperiod improves feed intake and energy metabolism of weanling pigs", Journal of Animal Science 80, (2002), 1736-1745.
Cao, J., et al., "Green and Blue Monochromatic Lights Promote Growth and Development of Broilers Via Stimulating Testosterone Secretion and Myofiber Growth", J. Appl. Poult. Res., 17(2), (2008), 211-218.
Carroll, Joseph, et al., "Photopigment basis for dichromatic color vision in the horse", Journal of Vision 1, (2001), 80-87.
Chiao, Chuan-Chin, et al., "Spectral tuning of dichromats to natural scenes", Vision on Research 40, (2000), 3257-3271.
Clarke, S, et al., "Energy Efficient Swine Lighting", Ontario Ministry of Agriculture Food and Rural Affairs, (Jan. 2006), 8 pgs.

(56) References Cited

OTHER PUBLICATIONS

Claus, R, et al., "Influence of light and photoperiodicity on pig prolifcacy", J Reprod. Fert., Supple 33, (1985), 185-197.

Claus, R, et al., "Influence of light and photoperiodicity on pig prolificacy", Journals of Reproduction & Fertility Ltd, (1985), 185-197.

Dartnall, H. J.A, et al., "Human Visual Pigments: Microspectrophotometric Results from the Eyes of Seven Persons", Proceedings of the Royal Society of London. Series B, Biological Sciences 220(1218), (Nov. 22, 1983), 115-130.

Davis, N. J, et al., "Preferences of Growing Fowls for Different Light Intensities in Relation to Age, Strain and Behaviour", Animal Welfare 8(3), (199), 193-203.

Deaton, JW, et al., "Effect of Intermittent Light on Broilers Reared under Moderate Temperature Conditions", Poultry Science, vol. 57, No. 3, (May 1, 1978), 785-788.

El Halawani, M. E., et al., "Light Intensity Requirement fo Breeder Hen Turkeys", Minnesota Turkey Gobbles, 66(4), (Jun. 2009), 3 pgs.

El Halawani, M. E., "Light spectrum and breeder hen turkeys egg production", Proeedings of the "Midwest Poultry Federation Convention", St. Paul., MN, (Oct. 2, 2007), 2 pgs.

Er, D., et al., "Effect of Monochromatic Light on the Egg Quality of Laying Hens", J. Appl. Poult. Res., 16(4), (2007), 605-612.

Gustafsson, G, et al., "Laying hens reactions on artificial light in a floor housing system", Agric Eng Int: CIGR Journal vol. 12, No. 2, (Jun. 2010), 21-30.

Halevy, O, et al., "Muscle development—Could environmental manipulations during embryogenesis of broilers change it?", 7 pgs.

Ham, A. D., et al., "Colour preferences and colour vision in poultry chicks", Proc. R. Soc. B, 274(1621), (2007), 1941-1948.

Jacobs, Gerald H, "Evolution of colour vision in mammals", Philosophical Transactions of the Royal Society 364, (2009), 2957-2967.

Jacobs, Gerald H, et al., "Photopigment basis for dichromatic color vision in cows, goats, and sheep", Visual Neuroscience 15, (1998), 581-584.

Kennedy, Donald, et al., "Selective Light Absorption by the Lenses of Lower Vertebrates, and Its Influence o n Spectral Sensitivity", The Biological Laboratories, Harvard University; Marine Biological Laboratory; and U. S . Fish and Wildlife Service Laboratory, Woods Hole, Mass., (1956), 12 pgs.

Kuhlmann, Josef, "Aviary System Layer Aviary", Farmer Automatic GmbH & CoKG, 4 pgs.

Kuhlmann, Josef, "Combi System Combi Layer System", Farmer Automatic GmbH & CoKG, 4 pgs.

Kuhlmann, Josef, "Floor System Layer Floor System", Farmer Automatic GmbH & CoKG, 4 pgs.

Kuhlmann, Josef, "Multi Deck System Layer Cage", Farmer Automatic GmbH & CoKG, 4 pgs.

Manci, William E, et al., "Design and Performance of an Electronic Lighting-Control Circuit That Simulates Sunrise and Sunset", The Progressive Fish-Culturist 54, (1992), 127-129.

Neitz, Jay, et al., "Spectral sensitivity of cones in an ungulate", Visual Neuroscience 2, (1989), 97-100.

Olanrewaju, H A, et al., "A Review of Lighting Programs for Broiler Production", International Journal of Poultry Science 5 (4), (2006), 301-308.

Prayitno, D S, et al., "The Effects of Color and Intensity of Light on Behavior and Leg Disorders in Broiler Chickens", Poultry Science 76, (1997), 1674-1681.

Prayitno, D. S., et al., "The Effects of Color and Lighting on the Behavior and Producton of Meat Chickens", Poultry Science, 7693), (1997), 452-457.

Prescott, N. B., et al., "Spectral sensitivity of the domestic fowl (*Gallusg. domesticus*)", British Poultry Science, 40(3), (1999), 332-339.

Rahimi, G., et al., "The Effect of Intermittent Lighting Schedule on Broiler Performance", International Journal of Poultry Science, 4(6), (2005), 396-398.

Rozenboim, I, et al., "New Monochromatic Light Source for Laying Hens", Poultry Science, 77, (1998), 1695-1698.

Rozenboim, I., et al., "The effect of a green and blue monochromatic light combination on broiler growth and development", Poultry Science, 83(5), (2004), 842-845.

Rozenboim, I., et al., "The Effect of Monochromatic Light on Broiler Growth and Development", Poultry Science, 78(1), (1999), 135-138.

Taylor, Nina, "Lighting for Pig Units", Report compiled for BPEX, [Online]. Retrieved from the Internet:<http://www.bpex.org.uk/media/39814/lighting-for-pig-units-final-report.pdf>, (Apr. 30, 2010), 1-74.

Taylor, Todd, "Great Green Hope: The Corporate Love Affair With Algae", Biomass Magazine, (Apr. 2010), 2 pgs.

Wilson, M., et al., "Impact of Lighting Programs on Broiler Performance", Technical Focus, vol. 1, No. 1, (c) 2011 COBB South Afrrica, (2011), 4 pgs.

Woodard, A E, et al., "Effect of Wave Length of Lighton Growth and reproduction in Japanese Quail", Oxford Journals.org, (Jun. 4, 1968), 6 pgs.

Yuhua, Xue, "Illumination and Benefit of Chicken Raising", New Countryside 2009 No. 3—w/ Concise Statement of Relevance Under 37 CFR 1.98(a)(3)(i) For Citation of Non-English Language Document(s) from Related/Counterpart Foreign Application, (Mar. 31, 2009), 3 pgs.

"U.S. Appl. No. 14/906,685, Corrected Notice of Allowability dated Feb. 21, 2019", 2 pgs.

"U.S. Appl. No. 15/472,554, Response filed Jun. 25, 2019 to Restriction Requirement dated Apr. 25, 2019", 5 pgs.

"U.S. Appl. No. 15/472,554, Restriction Requirement dated Apr. 25, 2019", 6 pgs.

Grajcar, Zdenko, "", Extended European Search Report Communication for EP Application No. 16818752.4-1106 / 316681, 8 pgs.

* cited by examiner

SYSTEM AND METHOD OF ILLUMINATING LIVESTOCK

CLAIM OF PRIORITY

This application is a continuation of and claims the benefit of priority of U.S. patent application Ser. No. 14/906,685, filed Jan. 21, 2016, which application claims the benefit of priority of and is a U.S. National Stage Application under 35 U.S.C. 371 from International Application No. PCT/US2014/049143, filed Jul. 31, 2014, published as WO 2015/017655 A1 on Feb. 5, 2015, which application claims the benefit of priority of U.S. Provisional Patent Application Ser. No. 61/861,645, entitled "System and Method for Manipulating Psychological and Physiological Characteristics of Swine," filed on Aug. 2, 2013, the entire contents of which are incorporated herein by reference.

TECHNICAL FIELD

This document pertains generally, but not by way of limitation, to lighting swine. More specifically to manipulating the psychological and physiological characteristics of swine through use of a lighting system.

BACKGROUND

The farming industry has greatly evolved over the past several decades, going from primarily outdoor based family farms to indoor corporate run facilities. For example, swine are typically kept in a barn environment where a plurality of pens are provided in side by side relation. Typically the flooring of the facilities are slated so that swine feces can be pushed between slats by the swine to a compartment below. In this manner the facilities house numerous swine indoors without access to the outside.

As a result, artificial lighting is a main source of lighting for the swine, whether incandescent, LED, high pressure sodium, compact fluorescent or the like. As scientists have studied animals, such as chickens, turkeys, swine, cows and the like under artificial light the scientists have come to understand not only how animals see light as compared to humans, but also the effects that characteristics of light have on different animals. In particular, scientists have recognized that photoperiod or the modulation of light to animals is important. Swine studies show that swine raised under continuous darkness for 24 hours were less active than swine raised under a modulated 12 hours of dark and 12 hours of light. Meanwhile swine under 24 hours of light were most active, but also showed increased levels of stress and thus the pigs welfare was considered to be affected by the presence of continuous darkness or light.

Similarly, another characteristic of light shown to effect animals is the irradiance or intensity of light. For example, tests in swine show that piglets raised under 2-6 or even 10 lux do not gain as much weight as compared to 70-100 lux light whereas 2500 lux light showed weight loss. Meanwhile in another test on piglets 50 lux light gave improved health and improved immune status as compared to 10, 20 40 and 120 lux light. So again, intensity of light is another light characteristic known to effect animals and swine.

A final factor that effects animals, including swine is the spectrum or color of light. Tests on swine show that use of red wavelength light results in heavier bodyweight and increased daily gain compared to UV, cool white or even daylight. From studies swine appear to preferred dark over light, especially during sleep and dark light reduces aggressive behavior in swine. In addition tests currently show that pigs struggle to detect light sources above 600 nm and are thus not overly sensitive to red lights, compared to enhanced sensitivity in the blue light spectrum.

In addition, a need in the art exists for energy efficient lighting within swine facilities. In particular swine facilities can contain 50, 100 or more lights depending on the size of the facility. Typically these facilities contain 100 Watt incandescent light bulbs that are a drain on energy and cause power bills to be tremendous. In addition, because of the environment there is an abundance of feces, ammonium, mud, food pieces and the like within the barn. Thus, typically the 100 Watt bulbs must be within a casing or jelly jar of some type to try to protect the lighting from the elements. In addition wash downs expose the lighting to water, again requiring protection for the lighting to prevent breakage, shortage or worse fire conditions.

Therefore, a principle object of the present invention is to provide cost effective lighting product for a swine facility.

Yet another object of the present invention is to manipulate characteristics of swine through use of a lighting system.

SUMMARY OF THE INVENTION

A method of illuminating livestock by using a plurality of lighting assemblies that are electrically connected to a dimming device. The lighting assemblies are dimmed from a white color that allows workers or others to see clearly within a livestock facility. The lighting assemblies are then dimmed from the white color to specific predetermined wavelength to result in a predetermined behavior of the livestock. In one embodiment the lighting assemblies are dimmed to a red colored light that is not detectable by the swine so that workers or people in the livestock facility can see, but the swine cannot see the light and believe it is night time and provide the predetermined response of sleeping or resting. In this manner the swine can receive additional dark time they desire during a time humans are using and working within a facility. In another embodiment the predetermined wavelength is a blue color that attracts the livestock to food to get them to eat at appropriate times.

DETAILED DESCRIPTION OF A PREFERRED EMBODIMENT OF THE INVENTION

The figures show a swine facility 10 that includes a dwelling 12 such as a barn or hog containment facility. The dwelling 12 has a plurality of containment units 14 such as pens, stalls and the like. The floor 16 of the containment units 14 consist of a plurality of slat elements 18 that sit in paralleled spaced relation to one another to form a plurality of openings 20 between consecutive slat elements 18. In one embodiment the slat elements 18 are angled or slanted with one end higher than the other to cause a downward slope toward an opening 20 in the floor 16. In this manner when a swine 22 steps on or rolls on feces 24 the feces 24 is pushed through the openings 20 below the floor 16. Similarly, during wash down of the containment units 16 the feces is power sprayed and the water and feces go through the openings 20 beneath the floor and into a reservoir 26.

The figures also show a lighting system 28 that in one embodiment includes a plurality of electrical conduit bodies 30 that receive and electrical input from an electrical source 32. The electrical conduit bodies 30 house wiring 34 that extend to provide an electric excitation signal to different areas in the dwelling. In one embodiment the wiring is electrically connected to a socket 36 to receive a lighting assembly 38.

The lighting assembly 38 includes a base 40 having electrical conducting elements 42 therein that threadably and electrically connects within the socket 36 as is known in the art. The base 40 is either threadably received or compression fit onto a frustroconally shaped body 44 having a hollow interior and a sidewall 48 that extends outwardly and away from a first end 50 having a first diameter to a second end 52 having a second diameter greater than the first diameter. In this manner when waste or feces or water is sprayed on the body 44 the material flows downwardly and off the assembly 38. At the second end is a ring element 54 that is of size and shape to engage a sealing element 56 that in a preferred embodiment is made from an elastic material that expands upon compression. The sealing element 56 is secured between the ring element 54 and heat sink 58 to provide a water tight seal therebetween. In this manner electrical wiring 60 is electrically connected to the conductive body through the body 44 and heat sink within a water tight assembly 38.

In an alternative embodiment a socket 36 is not presented and instead the wiring is directly provided. In this embodiment the body 44 with the base 40 are not provided and instead the electrical wiring 60 disposed through the heat sink is directly or hard wired to the wiring 34 of the conduit to provide a direct electrical connection. The heat sink is then threadably and/or sealing connected to the conduit again to provide a water tight seal to prevent water from being within the interior of the heat sink 58 and being exposed to the electrical wiring 60.

The heat sink 58 in a preferred embodiment is made of a plastic material and has a plurality of fin elements 62 that assist in conveying heat through the heat sink 58. The heat sink 58 extends from a first end 64 adjacent the conduit bodies 30 that receives the sealing element 56 in one embodiment and is sealed to a conduit body 30 in another to second end 66. The second end 66 is secured to a diffusion element 68 that has a frustroconical shape having a sidewall 69 that extends from a first end 70 outwardly and downwardly from the heat sink 58 to an open second end 72 having a diameter slightly greater than the diameter of the first end 70 and terminating in a lip element 74. By being sloped at an angle and downwardly, again, water, feces and other materials often known to swine facilities 10 flow off the diffusion element 68, yet the lip element 74 keeps a robust design to withstand the harsh environment.

Figure 1:
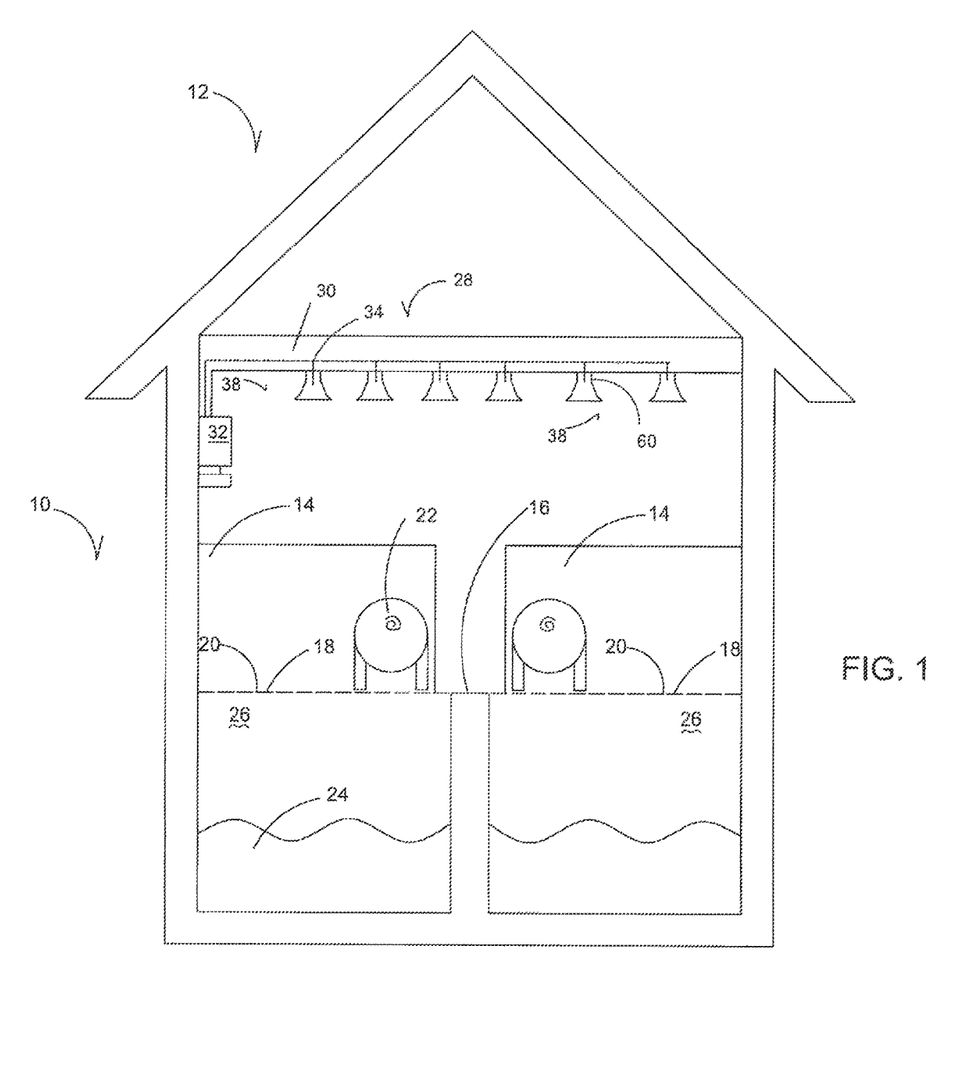
FIG. 1 is a cutaway side plan view of a dwelling for livestock.
Figure 2:
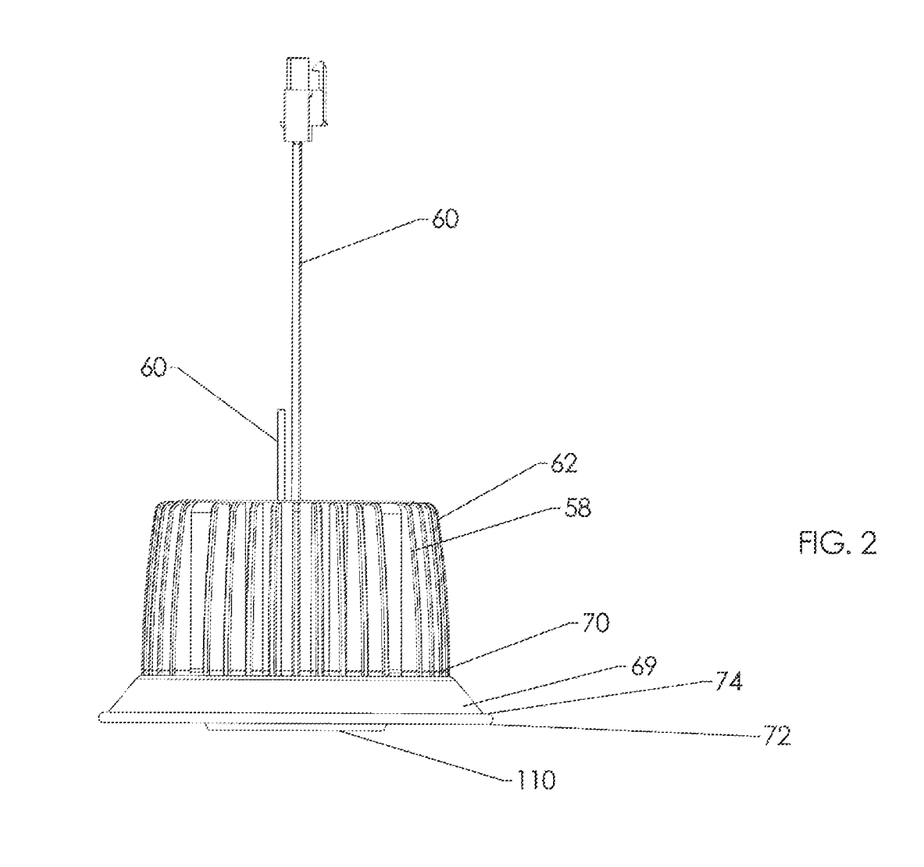
FIG. 2 is a side plan view of a lighting assembly for a dwelling for livestock.
Figure 3:
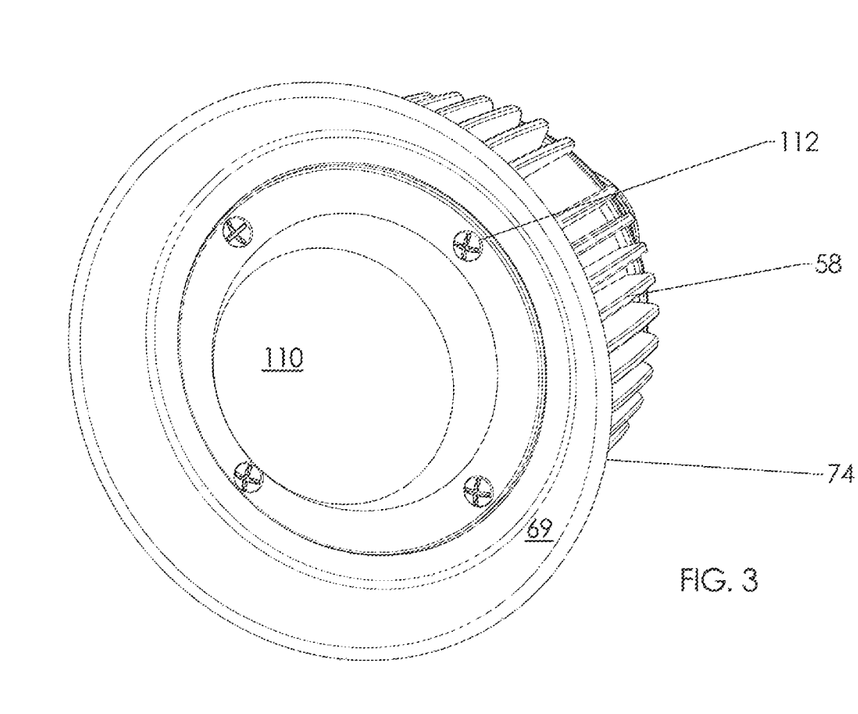
FIG. 3 is a side front perspective view of a lighting assembly for a dwelling for livestock.
Figure 4:
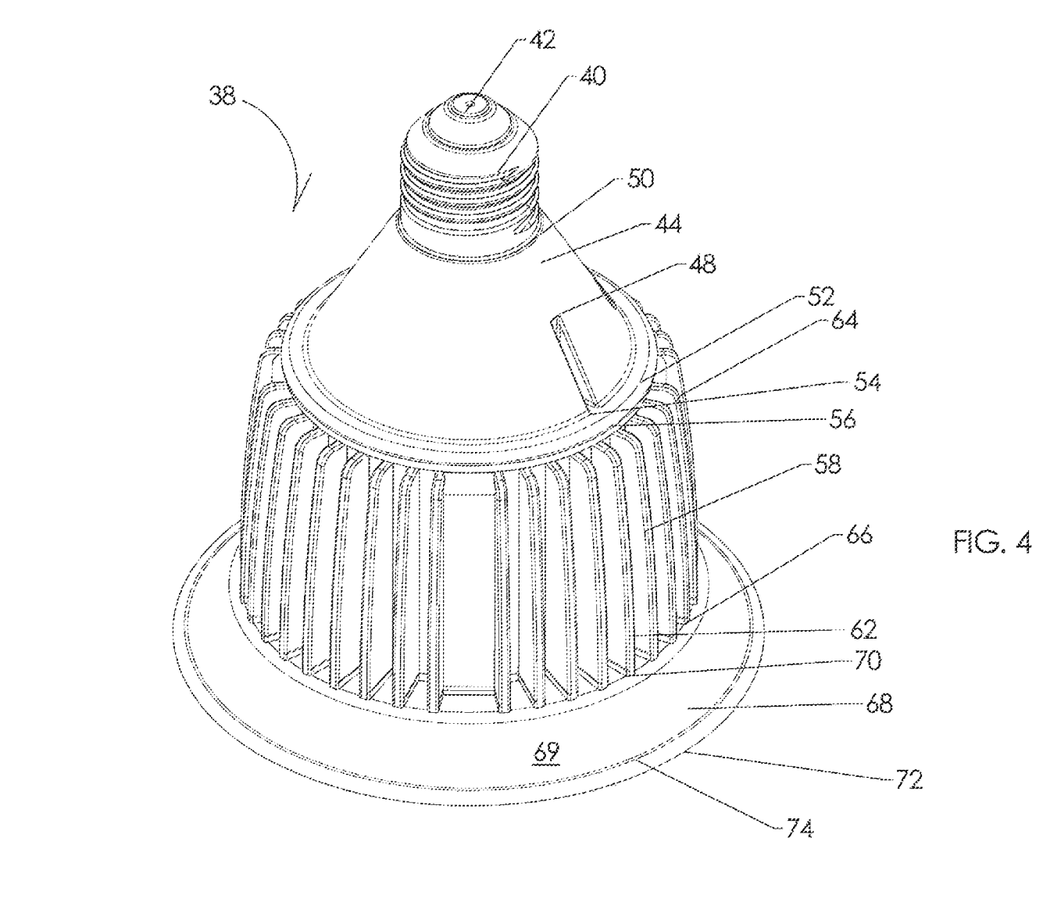
FIG. 4 is a top perspective view of a lighting assembly for a dwelling for livestock.
Figure 5:
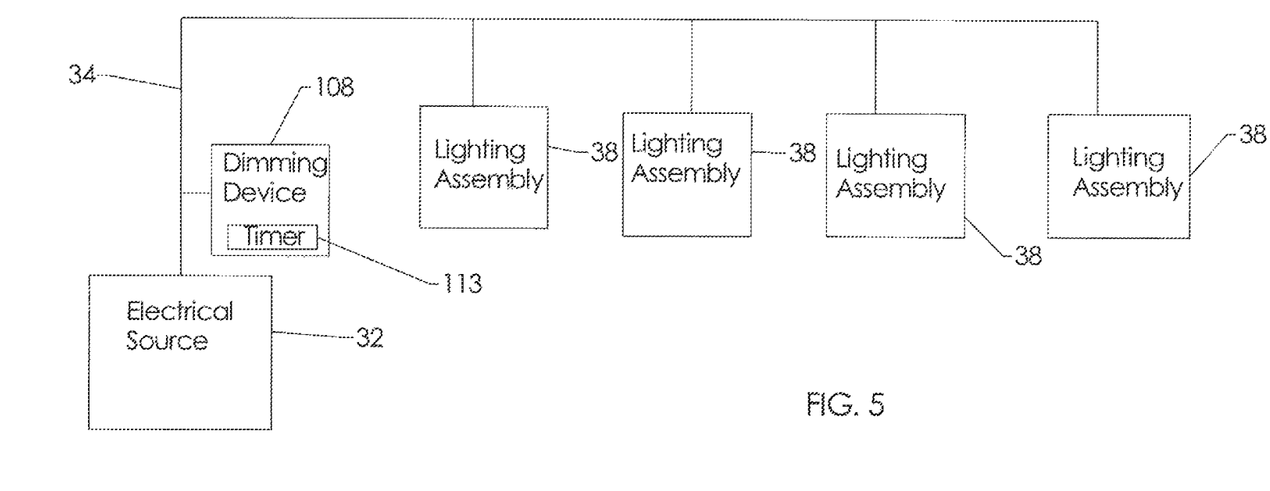
FIG. 5 is a schematic diagram of electric components for a lighting assembly for a dwelling for livestock.
Figure 6:
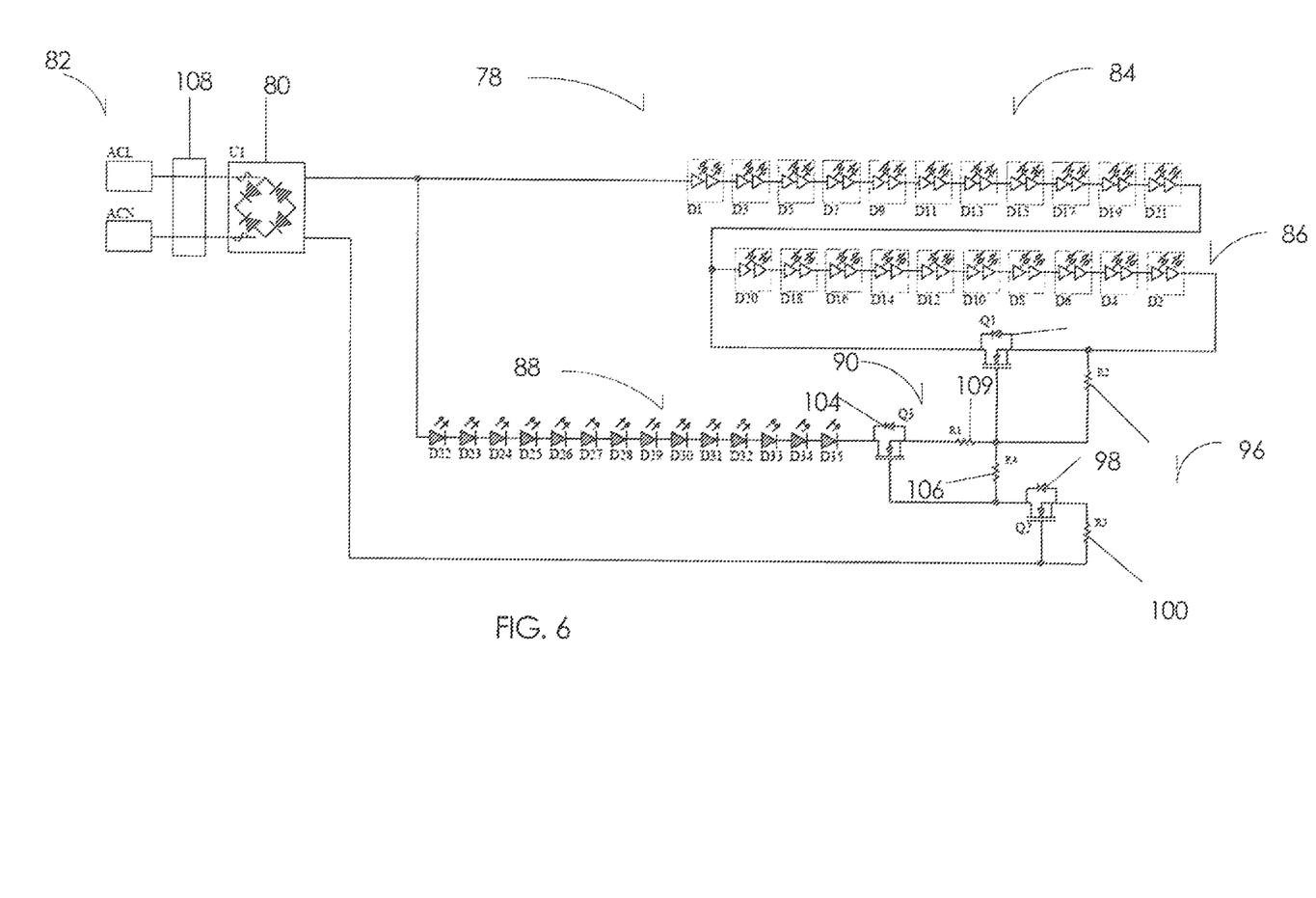
FIG. 6 is a schematic diagram of a lighting system for a dwelling for livestock.

A substrate 76 is also secured to the second end 66 of the heat sink 58 and in one embodiment has a generally round shape. The substrate also in one embodiment is a printed circuit board. FIG. 4 shows the substrate 76 having driving circuitry 78. The circuitry is similar to that taught in U.S. Pat. No. 8,373,363 entitled Reduction of Harmonic Distortion for LED Loads, by Z. Grajcar and issued on Feb. 12, 2013 and U.S. patent application entitled "Color Temperature Shift Control for Dimmable AC LED Lighting," Ser. No. 12/824,215, which was filed by Z. Grajcar on Jun. 27, 2010, the entire contents of each of which are incorporated herein by reference.

The circuitry 78 of the present invention includes a rectifying device 80 that receives current from an AC source 82 and includes a first group of light emitting diodes 84 arranged in series with a second group of light emitting diodes 86, both of which comprise diodes emitting white light. A third group of light emitting diodes 88 comprising diodes emitting red light are presented in parallel to the first and second groups of diodes 84 and 86. Red light emitted is considered any light having a wavelength approximately between 620 nm and 780 nm. Alternatively light emitting diodes having providing blue light, or having a wavelength approximately between 400 nm and 500 nm could be used without falling outside the scope of this invention. A bypass path 90 is presented with a first impedance element 92, that in one embodiment is a transistor. In a preferred embodiment the first impedance element 92 is a depletion MOSFET, though a p-channel MOSFET, n-channel MOSFET or the like can be used without falling outside the scope of this disclosure, even if an additional transistor is required for functionality purposes. A first resistor 94 is also provided to control the flow of current through the first impedance element 92 to provide smooth and continuous current flow.

A second bypass path 96 is also provided with a second impedance element 98 that similarly in one embodiment is a depletion MOSFET. Similar to the first bypass path 90 the second bypass path 96 utilizes a second resistor 100 again to control the impedance element 98. Similarly also, a third bypass path 102 is provided between the third group of light emitting diodes 88 and first and second groups of light emitting diodes 84 and 86. Again, this bypass path 102 utilizes a third impedance element 104 and third resistor 106 to provide similar functionality as the other bypass paths. In this manner when a dimming device 108 is electrically connected to the circuit and the voltage begins dropping, current flow to the first group of diodes 84 drops first, dimming out the first group of white diodes. Then as dimming continues and a threshold current is reached the second group of light emitting diodes 86 begin to dim. Thus, again white light is slowly dimmed and eliminated from the output light. In this manner only the third group of light emitting diodes 88 that are red remain providing light. A supplemental resistor 109 optionally is provided to limit current in the system and to improve efficiencies.

Therefore the assembly dims to produce a red light. Consequently, with a programmable dimming device the lighting assembly 38 can provide a combination of white and red light throughout a 24 hour period to optimize swine characteristics.

A lens element 110 is secured to the heat sink 58, diffusion element 68 or both. In one embodiment fastening elements 112 are utilized to provide the connection. In particular the lens element 110 is secured to provide a water tight seal so that water cannot encroach the interior of the assembly 38.

In operation a plurality of light assemblies 38 are installed into a facility 10 and electrically connected to a dimming device 108 having a programmable timer 113. The assembly is connected within the barn either directly or the body 44 can be attached to provide a retro fit if needed instead of a hard wire connection. In this manner the assembly 38 is modular in design.

The programmable timer can then be programmed to provide maximum lighting during times when workers or humans are present in the barn. Because swine do not detect red wavelength light, the red component of the light assembly provides additional intensity and lumens making it easier for workers to see and lighting up the facilities 10. Meanwhile, because the swine do not detect this light there are no harmful effects on the swine. Then as the day goes on the white light emitting diodes are dimmed out to present red light. Because the swine cannot detect the light they perceive this time as dark, allowing them to sleep, rest and provide optimum weight gain and feed consumption. Meanwhile, if people still need to be within the facility a light source allowing them to see and work is still provided.

Alternatively, the programmable timer can be adjusted so that more or less light is provided throughout a day to indicate to the swine that a particular season is provided. In this manner the behavior of the swine is manipulated enhancing farrowing, activity or other desired behavior. Thus, the lighting assembly 38 is used to manipulate both psychological and physiological characteristics of the swine to optimize growth, breeding and production of the swine. While presented in a preferred embodiment with red light emitting diodes, as indicated in the disclosure, blue light emitting diodes could similarly be used with the driving circuitry 78 and used to attract the swine to food or influence other swine behaviors without falling outside the scope of this disclosure.

When wash down of the facilities 10 is required the assemblies 38 are sprayed with water from a power washer, hose or other water supply. The water then envelopes any dirt, dust, feces or other containments and the frustroconical sections of the assembly 38 allow for easy removal of the containments keeping the assembly 38 and facility clean and sanitary. Because of the water tight seals water does not enter the interior of the assembly 38 again ensuring long life of the assembly 38. Thus, at the very least, all of the stated objects have been met.

What is claimed:

1. A method of illuminating livestock comprising:
   providing a first plurality of lighting assemblies and a second plurality of lighting assemblies within a livestock housing facility;
   illuminating the livestock with the first plurality of lighting assemblies and the second plurality of lighting assemblies by providing white light for a first predetermined period of time;
   dimming the first plurality of lighting assemblies to provide a red light at a first predetermined wavelength between 620 nanometers (nm) and 780 nm for a second predetermined amount of time;
   dimming the second plurality of lighting assemblies to provide a blue light at a second predetermined wavelength between 400 nm and 500 nm that attracts the livestock to food for a third predetermined amount of time; and
   wherein a programmable dimming device is programmed to dim the first plurality of lighting assemblies from the white light to the first predetermined wavelength between 620 nm and 780 nm at a first time, and to dim the second plurality of lighting assemblies from the white light to the second predetermined wavelength between 400 nm and 500 nm at a second time.

2. The method of claim 1 wherein the livestock is swine and the livestock housing facility is a swine facility.

3. The method of claim 1 wherein the red light at the first predetermined wavelength between 620 nm and 780 nm is provided throughout a 24-hour period, including during the first predetermined amount of time.

4. The method of claim 3 wherein at least one of the plurality of lighting assemblies has a plurality of light emitting diodes that illuminate the livestock.

5. The method of claim 4 wherein the at least one of the plurality of lighting assemblies is waterproof to prevent water from reaching the plurality of light emitting diodes.

6. The method of claim 1 wherein the first and second predetermined amounts of time are equal.

7. The method of claim 4 wherein providing white light includes providing current to a first group of light emitting diodes arranged in series with a second group of light emitting diodes that emit the white light.

8. The method of claim 7 wherein providing red light includes providing current to a third group of light emitting diodes that emit the red light.

9. The method of claim 8, wherein the third group of light emitting diodes are connected in parallel to the first group of light emitting diodes and second group of light emitting diodes.

10. The method of claim 7 wherein dimming the plurality of lighting assemblies to provide only the red light includes dropping current flow to the first group of diodes.

11. The method of claim 10 wherein dimming the plurality of lighting assemblies to provide only the red light includes dropping current flow to the second group of diodes.

* * * * *